Dec. 7, 1937.  W. P. SCHMITTER  2,101,515
GEARED MOTOR
Filed July 28, 1933  4 Sheets-Sheet 1
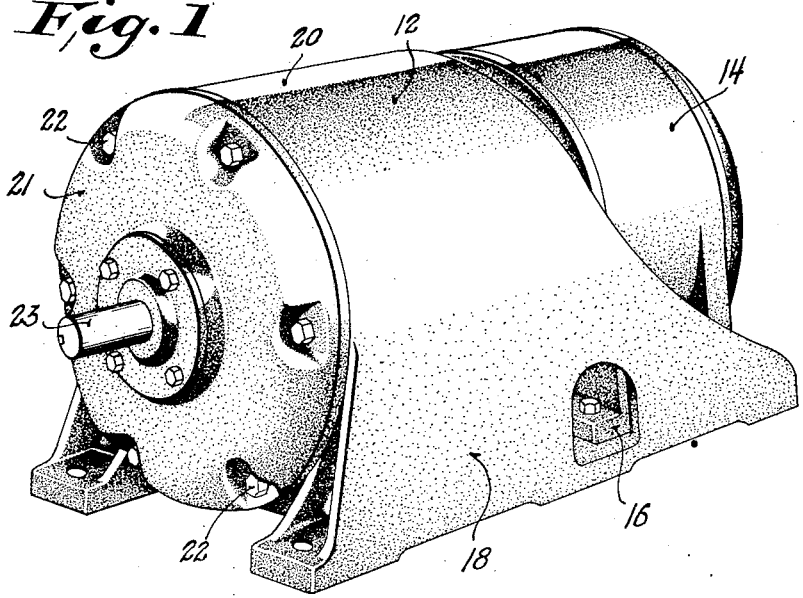
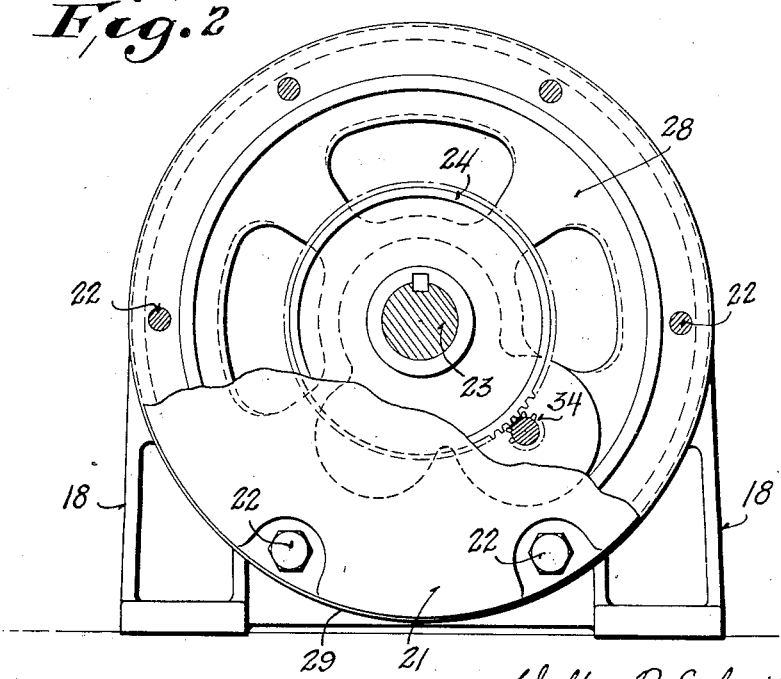
Inventor
Walter P. Schmitter
By
Attorney

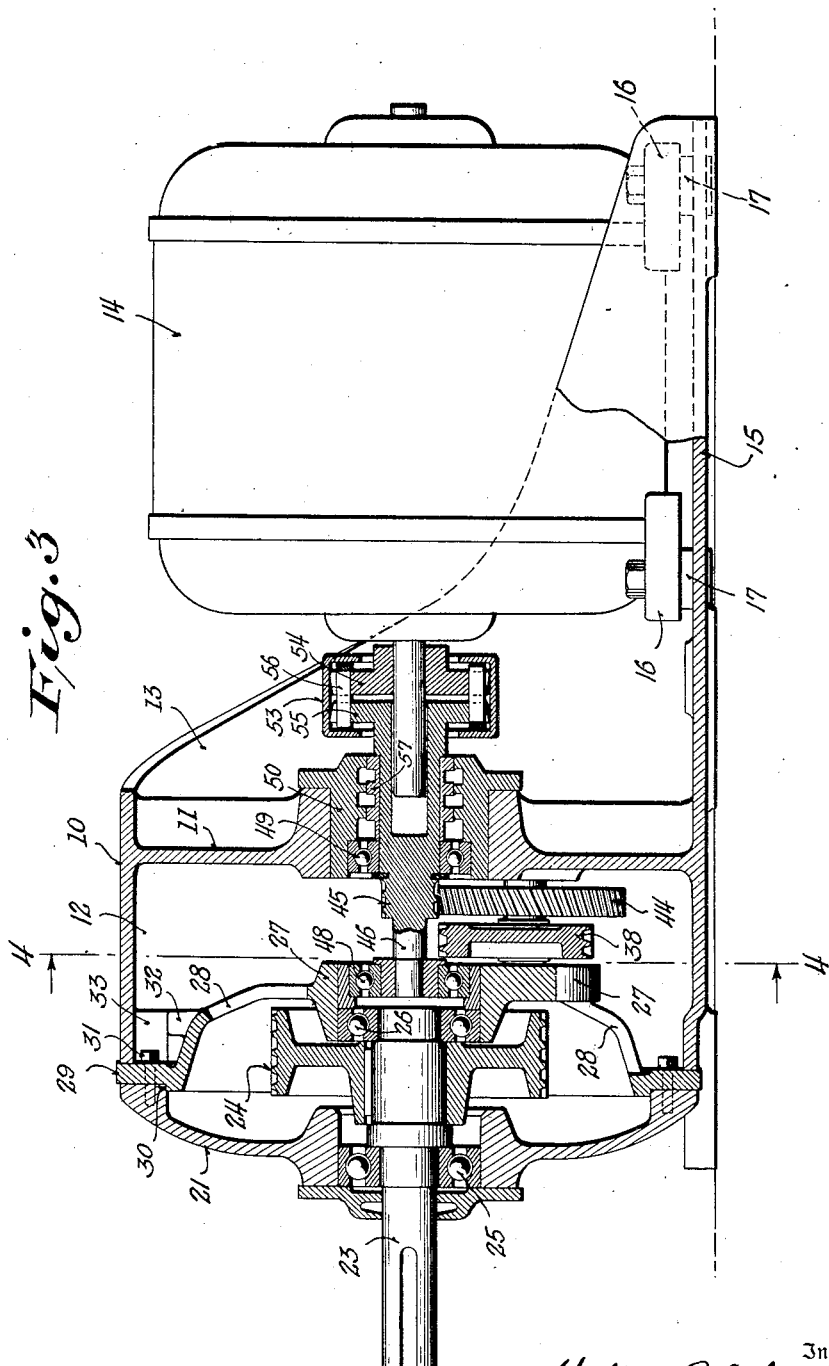

Dec. 7, 1937. W. P. SCHMITTER 2,101,515
GEARED MOTOR
Filed July 28, 1933 4 Sheets-Sheet 3

Inventor
Walter P. Schmitter
By Ralph W. Brown
Attorney

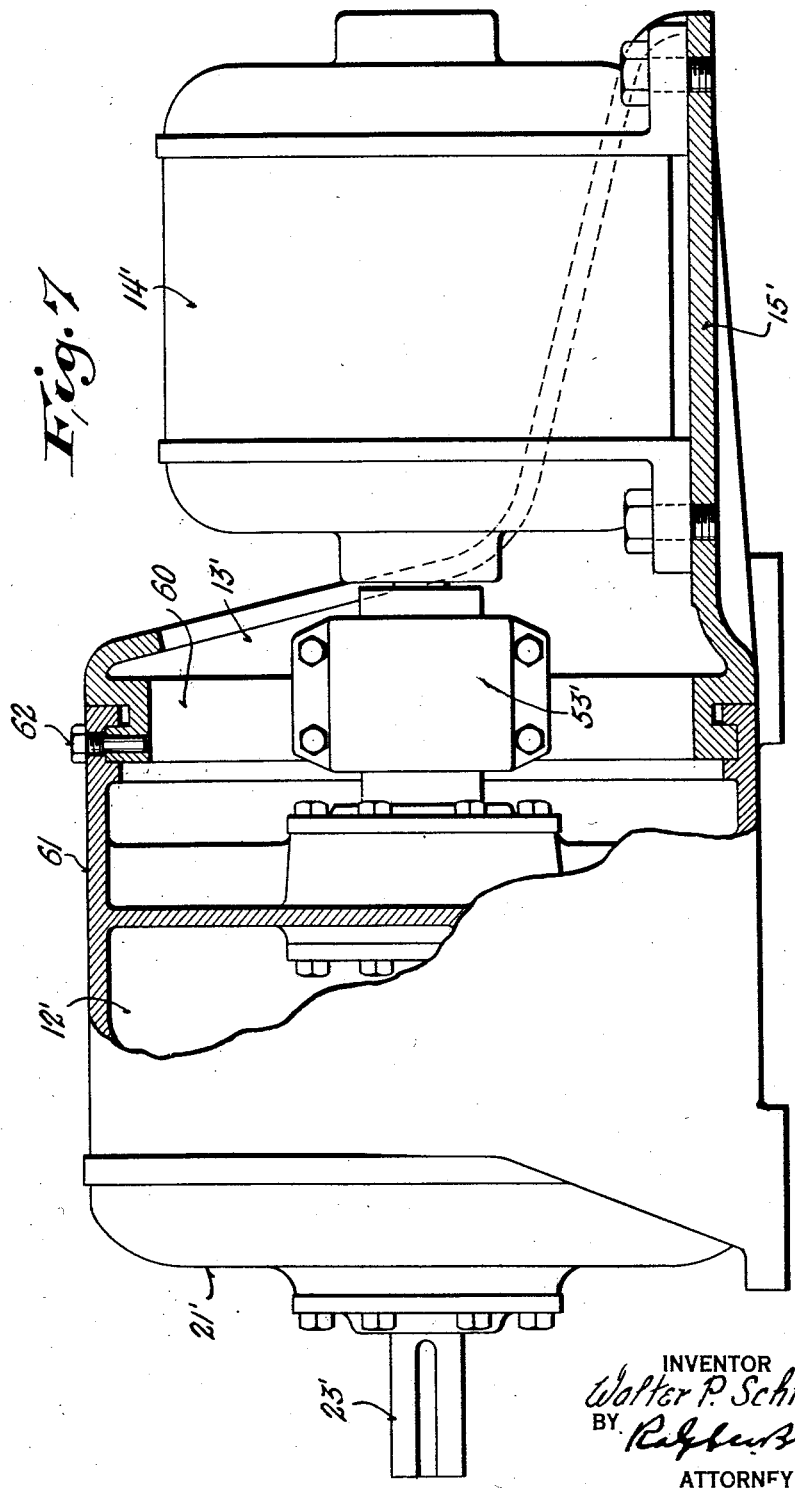

Patented Dec. 7, 1937

2,101,515

UNITED STATES PATENT OFFICE 2,101,515

GEARED MOTOR

Walter P. Schmitter, Milwaukee, Wis., assignor to The Falk Corporation, Milwaukee, Wis., a corporation of Wisconsin Application July 28, 1933, Serial No. 682,542

1 Claim. (Cl. 74—421)

This invention relates to geared electric motors of the type wherein the power developed by a motor at relatively high speeds is rendered available at reduced speeds through a reduction gearing forming a part of the unit.

In my prior Patent No. 1,971,968, dated August 28, 1934, I have disclosed a form of geared motor unit of exceptionally sturdy and compact design, involving an efficient, quiet running gear set contained within a housing, well adapted for structural combination with replaceable electric motors of various sizes and makes, without requiring material alteration in the motor.

In the unit shown in said patent, a footless vertical type motor is employed supported horizontally by connections applied to one end only of the motor. Motors of that type, though standard, are not as common as motors of the horizontal type, equipped with mounting feet, and are not as readily available to the ordinary user for replacement purposes.

An object of the present invention is to provide an improved geared motor unit wherein the motor is supported by the gear housing through means adapted for structural combination with the motor feet.

Other objects and advantages will appear, expressed or implied, from the following description of two illustrative embodiments of the present invention.

In the accompanying drawings:—

Figure 1 is a perspective view of a geared motor unit constructed in accordance with the present invention.

Fig. 2 is a front end view thereof with a part of the end head broken away.

Fig. 3 is a vertical longitudinal sectional view.

Figure 4:
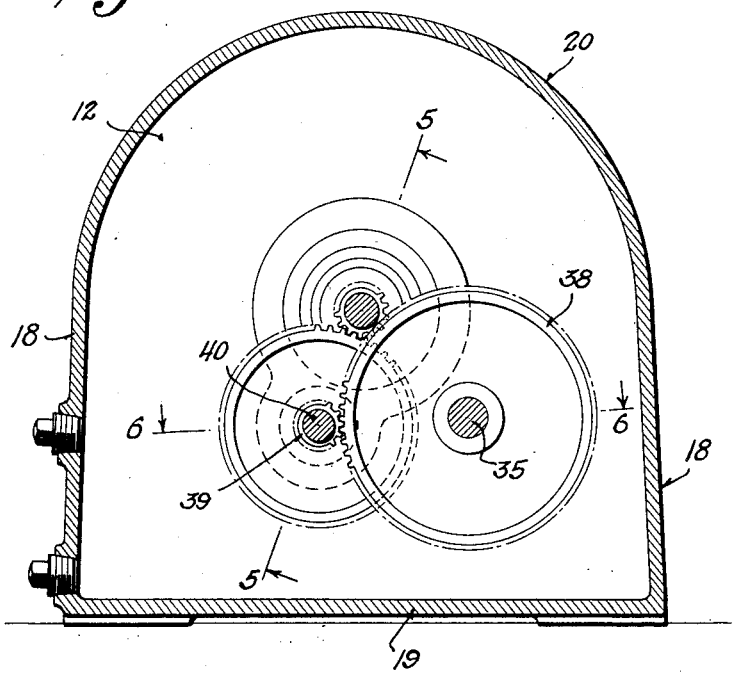
Fig. 4 is a sectional view on the line 4—4 of Fig. 3.
Figure 5:
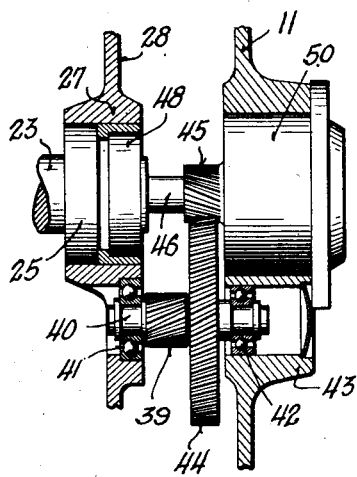
Figure 6:
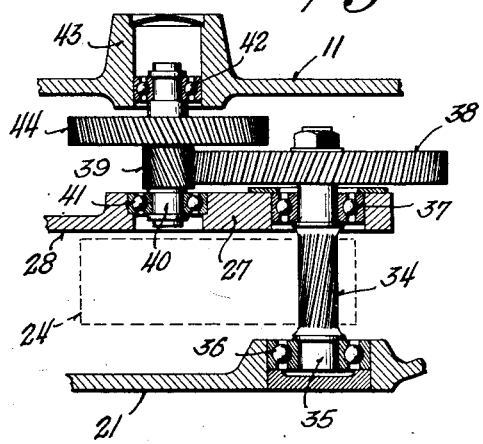

Figs. 5 and 6 are fragmentary sectional views on the lines 5—5 and 6—6, respectively, of Fig. 4.

Fig. 7 is a side elevation, partly in section, of a modified form of the present invention.

The geared motor shown in Figs. 1 to 6 comprises a housing 10, divided by an intermediate partition 11 to form at the forward end an oil tight enclosure 12 for the speed reduction gearing to be later described, and at the rear end an open portion 13 to receive and support a standard horizontal motor 14.

In this instance the end portion 13 constitutes an integral part of the housing 10 and includes a bottom portion in the form of a base plate 15 on which the motor is mounted and to which the motor feet 16 are releasably secured by bolting or otherwise. By the use of interchangeable blocks or pads 17 of various thicknesses, various sizes and shapes of motors may be employed properly aligned with the reduction gearing.

The gear enclosing portion 12 of the housing is similar in many respects to the corresponding portion of the housing shown in my prior patent above identified. It is provided with upright side walls 18 (Fig. 4) which rise from a substantially flat bottom 19 and merge into a substantially semi-cylindrical top wall 20, and at its forward end it is closed by a circular end head 21 removably secured thereto by screws 22 or the like.

A power take-off shaft 23, driven by a gear 24, projects forwardly through the end head 21. This shaft is journalled in an anti-friction bearing 25 in the head 21 and also in an anti-friction bearing 26 in a thickened portion 27 of a dished supporting structure 28. The structure 28 is provided with a peripheral mounting ring 29, interposed between the head 21 and the housing portion 12 and provided with a circular shoulder 30 engaged within the head to center the same with respect thereto. The ring 29 is preferably secured to the head 21 by screws 31 or otherwise.

A series of lugs 32 on the structure 28 coact with a corresponding series of internal lugs 33 on the housing portion 12 to brace the structure and to accurately center the same and end head 21 with respect to the housing. The housing lugs 33 also provide secure anchorage for the several head retaining screws 22.

The gear 24 is driven by a pinion 34 (Fig. 6) carried by a countershaft 35 jr rnalled in a forward bearing 36 in the end head 21 and in a rear bearing 37 in the portion 27 of the structure 28. The shaft 35 also carries a gear 38 which meshes with and is driven by a pinion 39 on a second countershaft 40.

Shaft 40 is journalled in a forward bearing 41 fixed in the portion 27 of the structure 28 and in a rear bearing 42 removably seated in a hub portion 43 of the partition 11. This shaft also carries a gear 44 which meshes with and is driven by a pinion 45 (Figs. 5 and 3) on a stub shaft 46 aligned with the power take-off shaft 23 and with the shaft 47 of the motor 14.

Shaft 46 (Fig. 3) is journalled in a forward bearing 48 in the portion 27 of the structure 28 and in a rear bearing 49 in a bushing 50 removably fixed in a hub portion 51 of the partition 11. The forward end of shaft 46 is removably seated in and centered by a bushing 52 removably fixed in the bearing 48, the arrangement being such that when the bushing 50 is withdrawn from the hub portion 51 it carries the shaft 46 and pinion 45 with it, leaving the bearing 48 within the structure 28.

The arrangement is also such that when the head 21 is removed, the structure 28, attached to it, is removed with it, carrying the several shafts 23, 35, and 40 and their coacting gears from the housing.

It will be noted that, with the several shafts and gears arranged in the manner described, a triple reduction in speed is provided between the motor shaft 46 and the power take-off shaft 23, the shafts and gears being enclosed in a housing substantially identical in shape and size with that disclosed in the applications above identified.

As indicated, particularly in Fig. 3, the stub shaft 46 is hollow at its rear end to loosely receive and accommodate the projecting end of the motor shaft 47, and is separably connected in driving relation with the shaft 47 preferably through an appropriate flexible coupling 53.

The coupling 53 is of a well known resilient type and is fully described in the prior patent to myself and Percy C. Day, No. 2,027,842, dated January 14, 1936. It includes a disk 54, keyed to the motor shaft 47, and a coacting disk 55, shown as formed integral with the rear end of the shaft 46. The disks are interconnected by resilient leaves 56 engaged in peripheral radial slots in the disks and confined within a suitable housing. A sleeve 57 on the shaft 46 is grooved, as indicated, for coaction with the bushing 50 to form an effective oil seal.

The geared motor shown in Fig. 7 includes a housing having a gear enclosing portion 12', substantially identical with that hereinabove described, and a motor supporting portion 13', structurally similar to the portion 13 hereinabove described, but removably attached to the portion 12'.

The power take-off shaft 23', projecting through the end head 21', is driven from the motor 14', through the coupling 53' and through a double or triple reduction gear train within the housing portion 12'.

In this instance the motor supporting portion 13' comprises a bottom 15' in the form of a plate extending horizontally from a vertical mounting ring 60 removably seated within a circular end flange 61 projecting rearwardly from the housing portion 12'. The ring 60 is removably fixed to the flange 61 by appropriate means 62, such for instance as the bayonet joint described in my copending application first hereinabove mentioned.

Various changes may be made in either of the embodiments of the invention hereinabove specifically described without departing from or sacrificing the advantages of the invention as defined in the appended claim.

I claim:—

In a device of the character described the combination of a casing having an end flange, a closure wall within said flange, a removable end head at the other end of said casing, a driven shaft journalled in said end head and projecting therefrom, speed reduction gearing within said casing for driving said shaft, a motor bracket having a portion removably fixed to said flange and also having a plate-like portion extending therefrom, a footed motor for driving said gearing, and means for attaching the feet of said motor to said plate-like portion to position and support the motor.

WALTER P. SCHMITTER.